W. H. Robertson,
Dressing Stone.
Nº 11,754.
Patented Oct. 3, 1854.
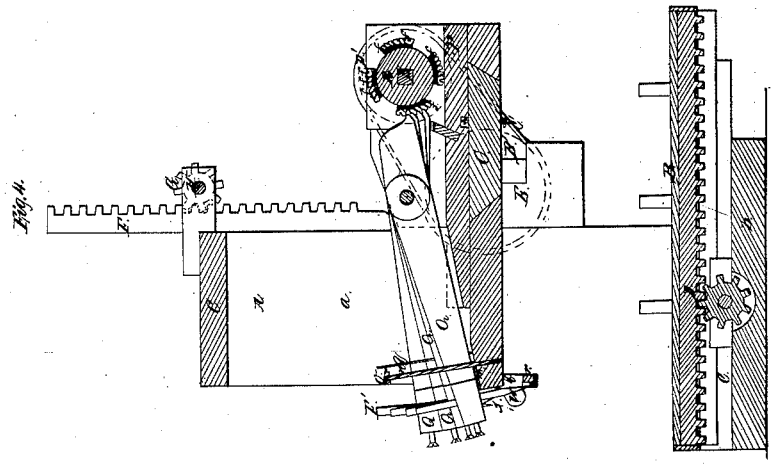
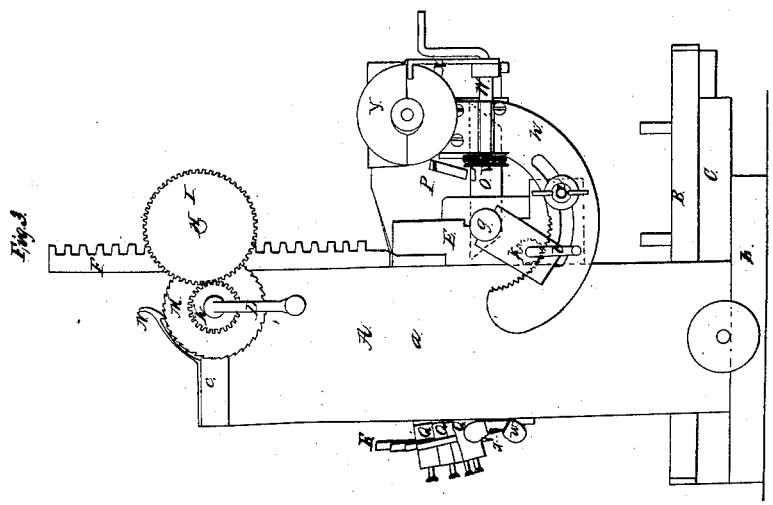

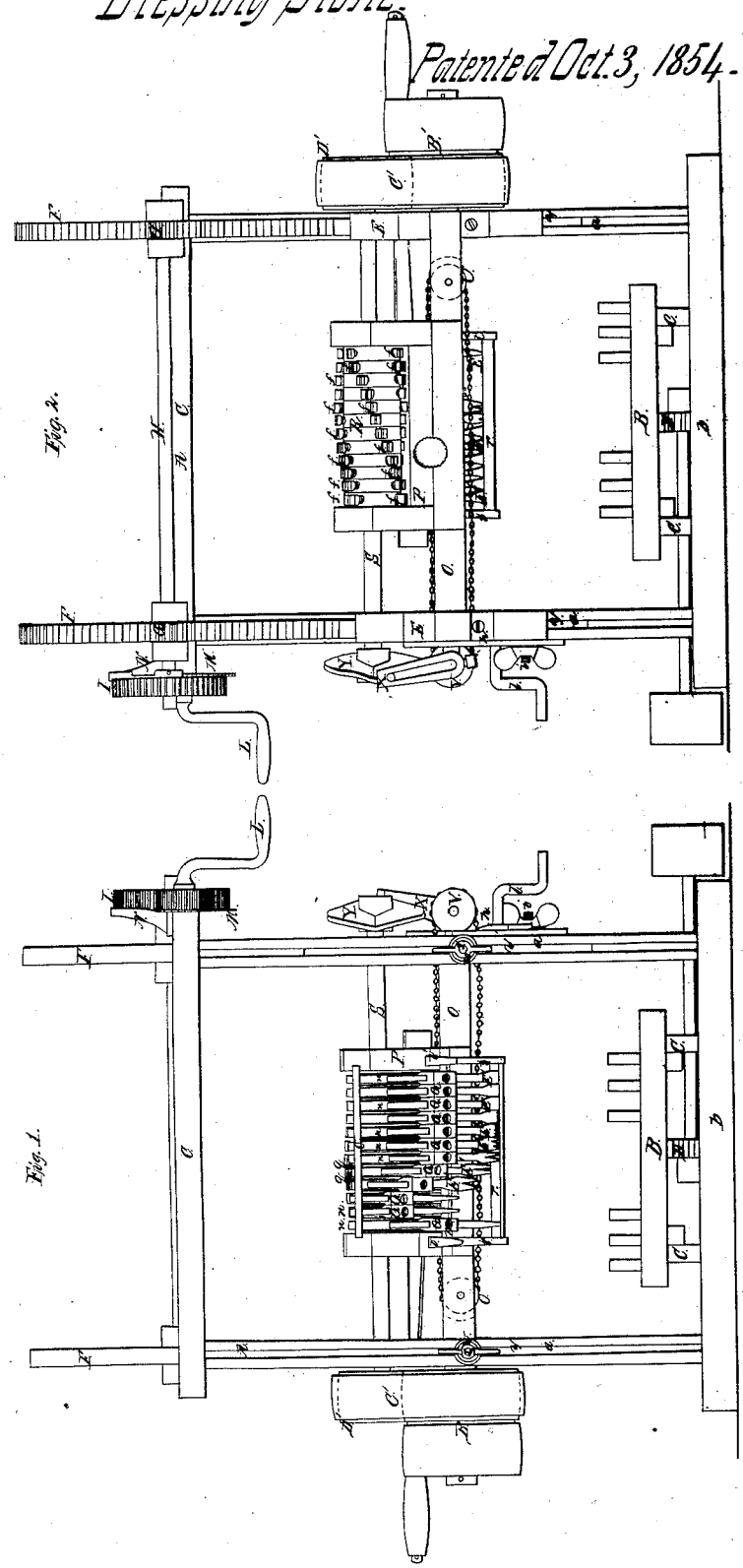

UNITED STATES PATENT OFFICE.

WM. H. ROBERTSON, OF HARTFORD, CONNECTICUT.

MACHINE FOR DRESSING STONE.

Specification of Letters Patent No. 11,754, dated October 3, 1854.

*To all whom it may concern:*

Be it known that I, WILLIAM H. ROBERTSON, of Hartford, in the county of Hartford and State of Connecticut, have invented an Improved Stone Cutting or Dressing Machine; and I do hereby declare that the same is fully described and represented in the following specification and the accompanying drawings, letters, figures and references thereof.

Of the said drawings, Figure 1, represents a front elevation of my machine. Fig. 2, is a rear elevation of the same. Fig. 3, is a side elevation of it, and Fig. 4, is a longitudinal, vertical and central section of it.

The operative parts of my machine are supported by a frame, A, of suitable material and composed of two upright standards, a, a, a bench or stand, b, upon which the standards are erected, and a cap, c.

The first part of the machine is a movable bed plate or carriage B, for sustaining the stone to be dressed or hammered. It is placed and sustained upon ways C, C, and may be moved forward and backward by means of a rack and pinion as seen at D, or by any other suitable mechanical contrivance which will impart to it a longitudinal movement during the time the cutters are in action.

The frame, A, serves to support two slides E, E, which by means of racks F, F, and pinions G, G, may be raised or depressed as occasion may require. These pinions, G, G, are affixed to a horizontal shaft, H, that is supported in bearings from the top of the frame, A. The said shaft carries a gear, I, which works into a pinion K, fixed upon the shaft of a crank L: by turning the crank L, motion will be imparted to the pinion and its gear wheel so as to cause the elevation and depression of the slides E, E. The shaft of the crank carries a ratchet M, to which a retaining spring pawl, N, is applied the object of which will be obvious. The said slides, E, E, serve as bearings for the journals of a cross head or turning frame, O, [one of these journals being shown at, g,] to which a movable frame, P, is placed so as to slide in lateral directions. This latter frame carries the cutting levers Q, Q, Q, and their cam roller, R, the said cam roller being made to slide freely upon square shafts, S, that is supported and carried by the turning frame, O. The movable cutter frame is attached to an endless belt which passes around rollers, pullies or sprocket wheels, U, V, the latter of these sprocket wheels being fixed upon a shaft, W, from which a bifurcated arm, X, extends upwards and receives into its fork a cam, Y, that is fixed upon the outer end of the square shaft of the cam roller hereinbefore mentioned. The cam Y, should be so formed that during an entire revolution of it, it shall impart a reciprocating vibrating movement to the bifurcated arm and thereby effect a reciprotaing lateral movement of the movable carriage that sustains the cutting levers hereinbefore mentioned. These levers Q, Q, play upon one common center bar or rod, A', are operated successively by cams or wipers f, f, projected from the cam roller R., which cam roller is put in revolution by means of a driving drum B', and an endless band, C', extending around said drum and a pulley, D', fixed upon the shaft that extends through the cam roller.

In order to set the turning frame at such an angle as may be necessary with respect to the horizontal frame, such turning frame must be provided with a curved rack bar, h, to which a set screw, i, and a turning pinion, k, and crank, l, are applied, the same being shown in side elevation in Fig. 3.

The several cutters or chisels are represented at E', E', E',: they are respectively fixed in the ends of the levers Q, Q, and are arranged with respect to said levers as seen in the drawings. When the levers are in their lowest position they repose upon a rest or bar, m, which makes a part of the carriage of the levers. These levers are separated from one another by guide rods n, n, which extend upwards from the carriage and into a common cross bar, o, and there may also be applied to each of the levers a spring catch, q, which shall extend upwards from the carriage of the lever and be so applied to the lever as to enable it to be held up in its highest position when occasion may require. These catches serve to catch up and stop any one or more of the chisels as occasion may require and particulary such as during the operation of dressing a stone might not be found to perform their work to advantage.

At the outer end of the chisel frame I apply a turning stop or adjustment bar r; it consists of a rebated bar suspended by two arms t, t, that are applied to the chisel frame so as to enable a person to turn the adjustment bar back out of the way or path of the chisels. These arms work against springs as seen at $v$, $v'$, which serve to hold them in a horizontal position as occasion may require. The object of the bar $r$, is to enable a person to set the several cutting edges of the chisels in their true cutting position when their levers are supported upon their rest bar or are down to their lowest position.

During the operation of the machine, the chisels become worn so as to require sharpening; when this is the case or they may get out of adjustment, their confining screws may be unscrewed and the bar $r$, turned down directly under the chisels; such chisels requiring sharpening may be next forced down toward the bar until they reach and rest upon it; this done, their screws may be set up and the bar turned back from underneath them. This adjustment bar may have any desirable form such as will cause the chisels to cut the stone in the shape of molding; and it constitutes a very important part of my stone dressing machine, as it enables me with great facility and correctness to adjust the chisels in their true position.

In my said machine as above described it will be perceived that the chisels are not only raised up and suffered to fall upon the stone, but during such movements, they are moved laterally with a reciprocating motion in order that they may break over or lap upon the courses of one another, and thus avoid the formation of ridges upon the stone when a smooth surface is required to be made thereon. The length of the carriage which supports the chisel carriage will be made considerably greater than the width of the said chisel carriage in order that the same may be moved upon it laterally and set over such part of the top surface of a stone as circumstances may require.

The manner in which the chisels are to be brought down upon the stone by means of the turning carriage will readily be understood from what has been hereinbefore described. When the turning carriage has been adjusted to any particular elevation it may be held in such position by means of clamp nuts $w$, $w$, that are applied to screws $x$, $x$, made to extend from the supporting frames of a turning carriage and through mortises $y$, $y$, formed in the posts of the main frame.

I do not claim the invention of a series of cutters or chisels applied respectively to levers operated by a set of cams; but What I do claim in combination herewith is—

1. The turning stop or adjustment bar $r$, applied to the chisel carriage and made to operate substantially in manner and for the purpose as specified.

2. I further claim in combination with the movable frame of the chisels and the mechanism for imparting to them their up and down movements, a sliding carriage and mechanism for imparting thereto short and reciprocating endwise or lateral movements substantially as specified in order that the chisels may be made to cut the stone without producing ridges between the parts as specified.

3. I further claim the combination of the series of catch springs or bars with the chisel levers and their carriage.

In testimony whereof I have hereunto set my signature this 14th day of August A. D. 1854.

WM. H. ROBERTSON.

Witnesses:
 WM. VINE,
 L. T. ROBINSON.